3,130,123
PROCESS FOR PREPARING METHYL AND ETHYL MERCURY HYDROXYQUINOLINATES AND PRODUCTS OBTAINED THEREBY
Robert O. Weiss, West Milford, and Seymour J. Lederer, East Paterson, N.J., assignors to Metalsalts Corporation, Hawthorne, N.J., a corporation of Nevada
No Drawing. Filed June 6, 1957, Ser. No. 663,877
8 Claims. (Cl. 167—33)

The present invention is directed to new compounds in the form of organic mercury derivatives, and more particularly to compounds having highly desirable properties as disinfectants, such as disinfectants for seeds and plants, and particularly as fungicides.

The present application is a continuation-in-part of our copending application Serial No. 514,748, filed June 10, 1955, now U.S. Patent No. 2,844,508.

There have been on the market for a number of years, seed disinfecting materials which are mercury derivatives and which generally have the formula R—Hg—X, wherein R is an organic radical and X is generally an inorganic acid radical. While such compounds have effectiveness in disinfecting seeds, they generally give only a limited protection at the surface of the seed. Many of the compounds of this type previously used have undesirable properties in that they are toxic to human beings and are corrosive to the skin.

The present invention is directed to the production of a series of organic mercury compounds which are highly effective for disinfection generally and particularly for the disinfecting of seeds, plants and soil.

It is among the objects of the present invention to provide compounds of the above described character which are substantially less toxic and which are less vesicant in the ordinary use and handling thereof, as compared to prior compounds.

It is also among the objects of the present invention to provide compounds of the type described, which have a substantial amount of water solubility and a sufficient amount of volatility at ordinary temperatures so that they may be used effectively either in aqueous solution or in dust compositions.

The compounds contemplated herein have the following general formula:

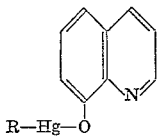

wherein R is methyl or ethyl, said compounds having a substantial degree of volatility at room temperatures combined with a substantial degree of solubility in water.

We have found that the above-defined compounds have a very desirable and useful balance between the degree of water solubility and the degree of volatility, so that they are highly effective for the disinfection of seeds, plants and soil while being at the same time less hazardous for the user to handle as compared with known alkyl mercurials. The volatility is also such that the effectiveness in use lasts a considerable period of time. Also, because of the definite though moderate degree of volatility, the volatilized portion creates a zone of protection around the seed and within the soil, including the area which is not in direct physical contact with the disinfecting agent. Thus a far greater degree of protection and a much better change of surviving in a healthy state is given to the seed because of the fungus-free zone surrounding it.

It is surprising that compounds of the present type are so highly efficient, in view of the ineffectiveness of the individual compounds from which the new compounds are prepared. Thus, 8-hydroxyquinoline, which is an active fungicide and a highly volatile compound, has been found to be ineffective as a cereal seed-treatment fungicide because of limited antimicrobial spectrum. The chelated metal salts, such as copper, bismuth, iron and zinc are so non-volatile that analytical procedures can be applied to them which require drying at elevated temperatures with no loss of product. Even mercury, which is itself a highly volatile metal and forms many volatile salts, yields non-volatile mercuric 8-hydroxyquinolinate. Diphenyl mercury and many phenyl mercuric salts are volatile. Yet, phenylmercuric 8-hydroxyquinolinate is relatively non-volatile.

In accordance with the present invention, the new compounds are prepared by reacting the methyl and ethyl mercuric salts, such as the halides (preferably the bromides and chlorides) and acetates, or methyl or ethyl mercuric hydroxide with 8-hydroxyquinoline in the case of the acetates and hydroxides, or with a soluble salt, preferably an alkali metal salt, of 8-hydroxyquinoline in the case of the halides. It was to be expected from the properties of the chelated metal salts of 8-hydroxyquinoline and of phenylmercuric 8-hydroxyquinoline that our new compounds would also be non-volatile. Nevertheless, the new lower alkyl mercuric 8-hydroxyquinolinates have been found to possess the surprising and unexpected property of having an adequate, although desirably limited, volatility. The volatility is of such an order that, for example, the methyl and ethyl mercuric 8-hydroxyquinolinates show excellent activity and reliability as cereal seed-treatment fungicides. They are, however, sufficiently less volatile than the alkyl mercuric compounds heretofore employed as cereal seed-treatment fungicides to make handling less hazardous and to permit storage for extended periods without the danger of toxic concentrations being built up in the atmosphere of the storage area.

The methyl and ethyl mercuric 8-hydroxyquinolinates of the present invention have also a surprising degree of solubility in water in comparison with higher alkyl and aralkyl mercuric hydroxyquinolinates. This valuable property makes it possible to use them in solution as well as in dusts; and whereas the alkyl mercuric salts most commonly used as cereal seed-treatment fungicides, such as ethyl mercuric chloride, ethyl mercuric phosphate, and methyl mercuric chloride are all highly powerful vesicants, the methyl and ethyl mercuric 8-hydroxyquinolinates have markedly decreased vesicant action, making handling much safer and simpler.

The invention is further illustrated by the examples given below, it being understood that said examples are presented only as illustrative of the invention and not in limitation thereof.

EXAMPLE 1

*Methyl Mercuric 8-Hydroxyquinolinate*

31 gms. of methyl mercuric iodide were added to a solution of 16.8 gms. of sodium 8-hydroxyquinolinate in 300 cc. of water. The mixture was agitated for 2 hours and filtered to yield 21.3 gms. of a golden yellow precipitate, melting point 135–137° C.

EXAMPLE 2

*Ethyl Mercuric 8-Hydroxyquinolinate*

To 16.8 gms. of sodium 8-hydroxyquinolinate in 300 cc. of water were added 30 gms. of ethyl mercuric hydroxide. The mixture was stirred for 2 hours. Filtration gave 22.4 gms. of golden yellow crystals, melting point 66–66.5° C.

EXAMPLE 3

*Ethyl Mercuric 8-Hydroxyquinolinate*

3800 gms. of a 6% solution of ethyl mercury acetate in water were added to 115 gms. of 8-hydroxyquinoline in 3600 gms. of alcohol. A stable solution resulted which contained 3.8% ethyl mercuric 8-hydroxyquinolinate and was highly effective as a seed disinfectant.

In the foregoing examples we have described the formation of our improved compounds by reacting a methyl or ethyl mercury salt or hydroxide in solution with an alkali metal 8-hydroxyquinolinate or, in the case of hydroxide, with 8-hydroxyquinoline. It is, however, possible to combine the starting materials in the dry condition by subjecting them to intimate mixing in a ball or stone mill. An example of this procedure is the following:

EXAMPLE 4

26.4 gms. of ethyl mercuric chloride, 14.5 gms. of 8-hydroxyquinoline and 8.4 gms. of sodium bicarbonate were introduced into a jar mill filled with the appropriate amount of stones. The mill was rotated for 5 hours. The resulting solid was the deep yellow color typical of the alkyl mercuric 8-hydroxyquinolinates (all starting materials were white). This is an excellent preparative method for the alkyl mercuric 8-hydroxyquinolinates. The yields are quantitative, and there is no need for a reaction solvent and no need for subsequently filtering and drying the product after the reaction. In place of sodium bicarbonate, other alkaline materials or basic-acting materials can be employed; for example, sodium carbonate, sodium hydroxide, potassium bicarbonate, carbonate and hydroxide, magnesium oxide and calcium oxide; and likewise organic bases, such as pyridine, piperidine, and the like, an excess being avoided in the case of the liquid organic bases so as to keep the product solid in character.

Our invention contemplates also the manufacture and marketing of an intimate mixture of the starting materials without any substantial reaction between them. Reaction will then take place upon mixing of the composition with water or aqueous alcohol or other nontoxic solvent prior to the application of the solution to the seeds, plants or soil. We have found it to be desirable to use an excess of the salt of 8-hydroxyquinolinate, as it appears to improve the action of the lower alkyl mercury 8-hydroxyquinolinate.

An excess of 8-hydroxyquinoline or of its salt can likewise be used in the reaction with the methyl or ethyl mercuric hydroxide, or with the halide, acetate or other reacting salt for preparing methyl or ethyl mercuric 8-hydroxyquinolinate for the market. There results an increase in the fungicidal and fungistatic activity which appears to be synergistic in character. The excess of the 8-hydroxyquinoline or its salt can be as much as one mole for each mole of the formed methyl or ethyl mercuric 8-hydroxyquinolinate. When 8-hydroxyquinoline is used in place of its salt in admixture with methyl or ethyl mercuric acetate or hydroxide in the dry condition, it is desirable to employ also an approximately equivalent amount of a basic material as the latter accelerates the reaction considerably on addition of the solvent prior to use; such basic material is, however, essential in the case of the halides, such as the chlorides, as is apparent from Examples 1 and 4, since the free phenol will not displace hydrochloric or other hydrohalic acid.

EXAMPLE 5

The higher solubility of methyl mercuric-8-hydroxyquinolinate can be used to great advantage in the preparation of solutions of very high concentration as follows:

To 1600 grams of 23.5% methyl mercuric acetate solution in water containing about 5% acetic acid there were added 209 grams of 8-hydroxyquinoline. A clear amber solution was obtained which contained 29% methyl mercuric-8-hydroxyquinolinate.

The extremely high solubility of the product is apparently due to the presence of acetic acid which acts as a solubilizing agent. The acetic acid concentration can be about 1–6%. This solution can be diluted with ethylene glycol or other water-miscible organic solvent which is not toxic to seeds or plants or with water, or with any mixture of such solvents to give stable diluted solutions of any desired concentration.

A solution of the above-indicated concentration (29% or thereabouts) can be economically transported and marketed in such form to be diluted at the site of use.

In similar manner, but to a more limited degree, solutions containing high concentrations of ethyl mercuric 8-hydroxyquinolinate can be prepared.

The volatility and water-solubility of the methyl and ethyl mercuric 8-hydroxyquinolinates of the present invention were determined and compared with those of other hydrocarbon-substituted mercuric 8-hydroxyquinolinates. The volatility was measured in percent of weight loss after standing for seven days exposed to the atmosphere at temperatures of 22–24° C. The results were as follows:

| Compound | Percent Weight-Loss | Percent Water-Solubility |
|---|---|---|
| Methyl mercuric 8-hydroxyquinolinate | 8.00 | 0.75 |
| Ethyl mercuric 8-hydroxyquinolinate | 0.30 | 0.85 |
| n-Butyl mercuric 8-hydroxyquinolinate | 0.20 | 0.28 |
| n-Lauryl mercuric 8-hydroxyquinolinate | 0.04 | 0.06 |
| n-Octadecyl mercuric 8-hydroxyquinolinate | 0.03 | 0.12 |
| Phenethyl mercuric 8-hydroxyquinolinate | 0.07 | 0.12 |

The weight loss of the methyl and ethyl compounds is sufficiently high to make the compounds highly satisfactory for seed disinfecting purposes. Also the solubility is sufficiently high for solutions thereof to contain an adequate amount of the compound to be effective, but the solubility is not so great that the dried residues of the solutions are readily dissolved by rain or the like. The volatility and solubility of the other compounds were too low for effective commercial use.

The relatively high, though limited, volatility and water-solubility of the compounds of the invention were in sharp contrast also to known metal derivatives of 8-hydroxyquinoline, as shown in the following table:

| Compound | Percent Weight-Loss | Percent Water-Solubility |
|---|---|---|
| Bismuth 8-hydroxyquinolinate | 0.00 | $1 \times 10^{-6}$ |
| Zinc 8-hydroxyquinolinate | 0.00 | $1 \times 10^{-5}$ |
| Mercury 8-hydroxyquinolinate | 0.00 | $1 \times 10^{-6}$ |

The loss of weight of these known compounds is zero, indicating that they are not at all volatile at ordinary atmosperic temperatures. Also the solubility in water, while being measurable, is so small as to be negligible, in view of which the compounds can not be used in aqueous solution.

While in the examples one of the starting materials is 8-hydroxyquinoline, or its salt, the process is also applicable to hydroxyquinolines wherein the hydroxy group is in any of the free positions other than the 8-position.

It will be understood that in place of the methyl or ethyl compounds specified in the above examples, there can be employed the corresponding ethyl or methyl compound, respectively; that in place of the iodide or chloride, other halides can be used; that the sodium 8-hydroxyquinolinates can be replaced by other soluble metal 8-hydroxyquinolinates or by a mixture of 8-hydroxyquinolinates and a base of the metal; and that the methyl and ethyl mercuric halides, acetates and hydroxides are generally interchangeable in equivalent proportions except that the halides require the use of a salt of hydroxyquinoline or the use of a base with free hydroxyquinoline.

The preparations of the present invention are active against the various fungi for which mercurial compounds are generally employed, such as *Penicillium citrinum*, Mucor, Hormodendrum, *Aspergillus niveus*, and the like; they are active also against various bacteria, including *Monilia albicans, Mucobacterium smegmatis, Bacillus subtilis,* and *Staphylococcus aureus.*

The methyl and ethyl compounds above described are preferably marketed in the form of aqueous-alcohol solutions in the proportion of about equal parts by volume, but this proportion can be varied. Thus solutions may be easily prepared containing about 2.6% of the methyl compound and about 3.3% of the ethyl compound. These solutions can be utilized without dilution in heavily infected areas; for average soils, the commercial solution can be diluted with 3 to 4 parts of water without causing precipitation of the salt. The alcohol aids in wetting the seeds which have a fatty coating, and in addition, increases the solubility of the mercury compound.

We prefer, however, to employ an alcohol or mixture of alcohols having a higher flash point than ethyl alcohol, namely, ethylene glycol, n-propyl alcohol, and the like. A satisfactory solvent mixture can consist of 25% ethylene glycol, 20% n-propyl alcohol and 55% of water. Other water-miscible organic solvents than can be used are the Cellosolves like methyl, ethyl and butyl Cellosolve and their esters, especially the acetates, the carbitols (methyl, ethyl, butyl, etc.) and their acetates; acetone, and other solvents which exhibit no substantial degree of phytotoxicity.

By employing a solvent compound of 70% ethylene glycol and 30% water, a solution containing about 35% of methyl mercuric 8-hydroxyquinolinate can be obtained. By combining 100 cc. of a 50% solution of methyl mercuric acetate in water with about 100 cc. of a solution of an equimolecular amount of 8-hydroxyquinoline in ethylene glycol, a highly concentrated solution of methyl mercuric 8-hydroxyquinolinate is obtained which can be diluted with water before use without causing precipitation.

Because of the ease with which the compounds of the present invention can be dissolved in water or in the water-alcohol mixture, they can be sold in the dry condition. If desired, the methyl and ethyl compounds can be employed in admixture. About ¾ to 2 ounces of either compound or of a mixture thereof can be employed for each bushel of seeds.

We claim:

1. A disinfectant preparation consisting essentially of an approximately 2.6 to 3.3% solution of a member of the group consisting of methyl and ethyl mercuric 8-hydroxyquinolinates in a solvent composed of about 25% ethylene glycol, 20% n-proply alcohol and 55% water.

2. An aqueous solution of a member of the group consisting of methyl and ethyl mercuric 8-hydroxyquinolinate containing a quantity of acetic acid of the order of 1 to 6%.

3. An approximately 29% solution of methyl mercuric 8-hydroxyquinolinate in water containing a quantity of acetic acid of the order of 1 to 6%.

4. A disinfectant preparation consisting essentially of a member of the group consisting of methyl and ethyl mercuric 8-hydroxyquinolinate in a solvent consisting of approximately equal parts of water and at least one member of the group consisting of ethyl alcohol, ethylene glycol and n-propyl alcohol.

5. A disinfectant preparation consisting essentially of a solution of a member of the group consisting of methyl and ethyl mercuric 8-hydroxyquinolinates in a solvent composed of about 70% ethylene glycol and 30% of water.

6. A disinfectant preparation consisting essentially of a solution of a member of the group consisting of methyl and ethyl mercuric 8-hydroxyquinolinates in a solvent composed of approximately equal parts of ethylene glycol and water.

7. Process for preparing a concentrated solution of a member of the group consisting of methyl and ethyl mercuric 8-hydroxyquinolinates, which comprises reacting an approximately 6% solution of a member of the group consisting of methyl and ethyl mercuric acetate in water with about an equal volume of an alcohol solution of an approximately equivalent quantity of 8-hydroxyquinoline to form a stable solution containing approximately 3.8% of methyl or ethyl mercuric 8-hydroxyquinolinate.

8. Process for the manufacture of a disinfectant solution which comprises reacting an approximately 23.5% solution of methyl mercuric acetate in water containing about 1 to 6% acetic acid with an equivalent quantity of 8-hydroxyquinoline to form a solution containing approximately 29% of methyl mercuric 8-hydroxyquinolinate.

References Cited in the file of this patent

UNITED STATES PATENTS

| | | |
|---|---|---|
| 2,085,065 | Anderson | June 29, 1937 |
| 2,119,701 | Callsen | June 7, 1938 |
| 2,423,262 | Sowa | July 1, 1947 |
| 2,619,446 | Andersen | Nov. 25, 1952 |
| 2,844,508 | Weiss et al. | July 22, 1958 |

FOREIGN PATENTS

| | | |
|---|---|---|
| 736,399 | Great Britain | Sept. 7, 1955 |

OTHER REFERENCES

Lettre et al.: Die Naturwissenschaften, vol. 3L, pp. 127 to 128 (1947).